UNITED STATES PATENT OFFICE.

WILLIAM H. SPENCER, OF BROOKLYN, NEW YORK.

IMPROVEMENT IN THE MANUFACTURE OF ILLUMINATING-GAS.

Specification forming part of Letters Patent No. 131,035, dated September 3, 1872.

Specification of Improved Method of Manufacturing Illuminating-Gas from Liquid Hydrocarbons, invented by WILLIAM H. SPENCER, of Brooklyn, Kings county, New York.

I prefer making my retorts of the same shape and setting them in the same manner as specified and illustrated by me in patent No. 123,950, dated February 20, 1872.

My method of manufacture consists in introducing petroleum or other liquid hydrocarbons directly into a red-hot retort, the temperature of which shall be sufficient not only to vaporize but to decompose the liquid. The gas so formed is of a permanent nature and of very high illuminating power. If desired, it may be made and stored in any suitable receptacle until required for the second part of the operation, which consists in taking the rich or olefiant gas, as described above, either from the holder in which it has been stored, or in a heated state as it comes from the decomposing-retorts, and conveying the same, mixed with steam at its ordinary temperatures, or dried to a degree approximating 400° Fahrenheit, to a second retort or series of retorts, where the combined rich gas and aqueous vapors are heated to a degree sufficient to decompose the former. This decomposition changes the rich or olefiant gas (of general constitution $C_2H_2$) to light carbureted hydrogen $CH_2$, and the equivalent of carbon being eliminated at a high temperature and in a state of minute subdivision, readily becomes incandescent and in turn decomposes a portion of the aqueous vapor.

I claim for my process the following advantages: First, I avoid carrying an excessive heat, by reason of the hydrocarbon being actually decomposed before coming in contact with the steam. In the various patents hitherto granted the vapors are decomposed in the presence of the steam, thereby rendering a large quantity of its heat latent, and requiring either an excessive heat or a very slow manipulation to restore the temperature necessary for the second decomposition of the rich gas, as described. From the fact that the rich gas alone is decomposed in the presence of the steam the carbon is not only finely divided, but the adjacent steam is not cooled to nearly the extent that it is by the first change of the hydrocarbon from the liquid or vaporous form to the gaseous form. The carbon therefore readily becomes incandescent, which is essential to the decomposition of the steam or aqueous vapor.

Having thus described my invention, I claim—

The combined processes of first decomposing liquid hydrocarbons by direct heat and not in the presence of steam, and the subsequent mixing of the rich gas so formed with aqueous vapor and subjecting the mixture to a heat sufficient to effect the double decomposition hereinbefore described.

Signed by me this 11th day of July, A. D. 1872.

WM. H. SPENCER.

Witnesses:
   GEO. T. PINCKNEY,
   CHAS. H. SMITH.